(12) United States Patent
Hess

(10) Patent No.: US 8,359,160 B2
(45) Date of Patent: Jan. 22, 2013

(54) METHOD FOR THE OPERATION OF A NAVIGATION DEVICE

(75) Inventor: Philipp Hess, Grosshansdorf (DE)

(73) Assignee: Garmin Würzburg GmbH (DE)

( * ) Notice: Subject to any disclaimer, the term of this patent is extended or adjusted under 35 U.S.C. 154(b) by 473 days.

(21) Appl. No.: 12/664,123

(22) PCT Filed: Jun. 3, 2008

(86) PCT No.: PCT/DE2008/000913
§ 371 (c)(1),
(2), (4) Date: Dec. 11, 2009

(87) PCT Pub. No.: WO2008/154891
PCT Pub. Date: Dec. 24, 2008

(65) Prior Publication Data
US 2010/0185386 A1   Jul. 22, 2010

(30) Foreign Application Priority Data
Jun. 15, 2007   (DE) .......................... 10 2007 028 401

(51) Int. Cl.
*G01C 21/34*   (2006.01)
(52) U.S. Cl. ......................................... 701/533; 701/532
(58) Field of Classification Search .................. 701/400, 701/408, 410, 412, 418, 419, 421, 428, 429, 701/431, 436, 437, 467, 532, 533; 340/995.2
See application file for complete search history.

(56) References Cited

U.S. PATENT DOCUMENTS

| | | | |
|---|---|---|---|
| 5,612,881 A | | 3/1997 | Moroto et al. |
| 5,902,350 A | * | 5/1999 | Tamai et al. ................ 701/437 |
| 6,122,593 A | * | 9/2000 | Friederich et al. ............ 701/532 |
| 6,556,917 B1 | | 4/2003 | Wawra et al. |
| 6,622,085 B1 | | 9/2003 | Amita et al. |

(Continued)

FOREIGN PATENT DOCUMENTS

DE   19547574 A1   10/1996

(Continued)

OTHER PUBLICATIONS

"PCT International Search Report dated Oct. 7, 2008 for PCT/DE2008/000913, from which the instant application is based," 2 pgs.

(Continued)

*Primary Examiner* — Thomas Black
*Assistant Examiner* — Marthe Marc-Coleman
(74) *Attorney, Agent, or Firm* — Samuel M. Korte; Mohammad M. Ali

(57) ABSTRACT

The present invention relates to a method for operating a navigation device comprising an input device into which operating commands and/or location data, especially start data and/or destination data, can be entered, a road network database, a route calculation unit for calculating and storing a planned route taking into account the location data and the road network database, a signal receiving unit for receiving position signals, particularly GPS signals, a position determining unit for determining the current position of a vehicle, and a display device. In embodiments, the method comprises the following steps: a) the current vehicle position is determined taking into account the received position signals; b) a route preview is calculated which represents at least one section of the planned route as a film sequence, starting from the current vehicle position; c) the route preview is displayed.

33 Claims, 1 Drawing Sheet

U.S. PATENT DOCUMENTS

| | | |
|---|---|---|
| 6,650,999 B1 | 11/2003 | Brust et al. |
| 6,674,434 B1 | 1/2004 | Chojnacki et al. |
| 7,283,905 B1 | 10/2007 | Beesley et al. |
| 2002/0082025 A1 | 6/2002 | Baese et al. |
| 2003/0011676 A1 | 1/2003 | Hunter et al. |
| 2003/0154023 A1 | 8/2003 | Utsumi |
| 2003/0154024 A1* | 8/2003 | Klein et al. ............. 701/210 |
| 2004/0098178 A1* | 5/2004 | Brady et al. ............. 701/4 |
| 2005/0190076 A1 | 9/2005 | Howard et al. |
| 2006/0020387 A1 | 1/2006 | Nagata et al. |
| 2006/0089798 A1* | 4/2006 | Kaufman et al. ......... 701/211 |
| 2006/0092002 A1 | 5/2006 | Finkelstein |
| 2006/0111835 A1 | 5/2006 | Baker et al. |
| 2006/0155465 A1 | 7/2006 | Jung et al. |
| 2007/0027625 A1 | 2/2007 | Kamdar et al. |
| 2007/0067104 A1* | 3/2007 | Mays ..................... 701/211 |
| 2007/0150179 A1* | 6/2007 | Pinkus et al. ............ 701/208 |
| 2007/0226243 A1 | 9/2007 | Fuki et al. |
| 2007/0233380 A1* | 10/2007 | Tanaka .................. 701/211 |
| 2008/0046178 A1 | 2/2008 | Tava et al. |
| 2008/0065314 A1* | 3/2008 | Weiss ................... 701/200 |
| 2008/0100476 A1* | 5/2008 | Kim ..................... 340/995.2 |

FOREIGN PATENT DOCUMENTS

| | | |
|---|---|---|
| DE | 19923750 A1 | 11/1999 |
| DE | 19938951 A1 | 3/2001 |
| DE | 19941477 A1 | 3/2001 |
| DE | 10051406 A1 | 5/2002 |
| DE | 10307591 A1 | 9/2003 |
| DE | 102004043177 A1 | 11/2005 |
| DE | 102005004332 A1 | 8/2006 |
| DE | 102006038676 A1 | 8/2008 |
| EP | 0645603 A1 | 3/1995 |
| EP | 0702208 A2 | 3/1996 |
| EP | 1172631 A1 | 1/2002 |
| EP | 1191500 A1 | 3/2002 |
| EP | 1234735 A1 | 8/2002 |
| EP | 1471329 A2 | 10/2004 |
| EP | 1600912 A1 | 11/2005 |
| EP | 1605419 A1 | 12/2005 |
| EP | 1653196 A | 5/2006 |
| EP | 1818892 A1 | 8/2007 |
| JP | 2003232648 A | 8/2003 |
| WO | 0034933 A1 | 6/2000 |
| WO | 2004076978 A1 | 9/2004 |

OTHER PUBLICATIONS

"PCT International Search Report dated Oct. 20, 2008 for PCT/DE2008/000921," 6 pgs.

* cited by examiner

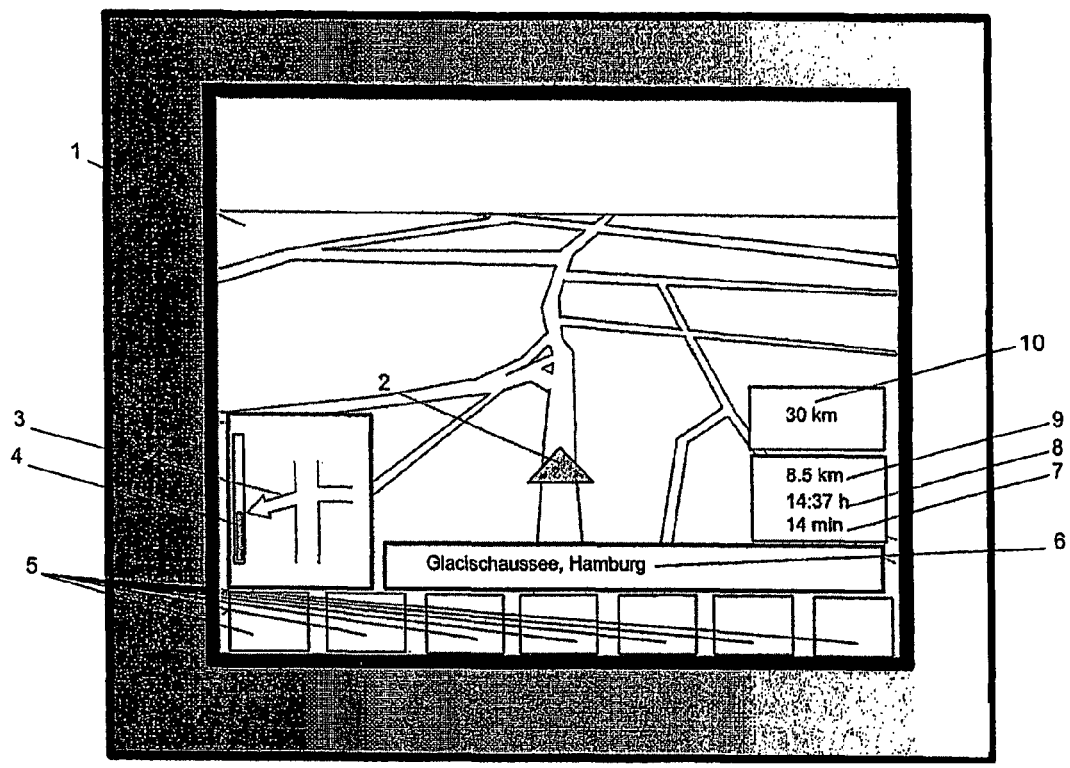

METHOD FOR THE OPERATION OF A NAVIGATION DEVICE

RELATED APPLICATIONS

This application is a US 371 national stage entry of International Application No. PCT/DE2008/000913, filed Jun. 3, 2008, which claims priority to German Patent Application No. 10 2007 028 401.4, filed Jun. 15, 2007, the teachings of which are incorporated herein by reference.

BACKGROUND

The present invention relates to a method for operating a navigation device. The navigation device thereby generically comprises an input device into which operating commands and/or location data, especially start data and/or destination data, can be entered. The input device can thereby be designed as a conventional type of keyboard or as a touch screen. By means of the input device, the user is capable of entering the data required for calculating a route that guides the user from a starting point to a destination.

Besides, the navigation device comprises a road network database. This road network database encompasses all of the necessary geographical data required for performing a routing operation when the planned route is calculated.

By means of a route calculation unit comprised by the navigation device, suitable algorithms for calculating and storing the planned route can be executed. When the route is calculated, the user data entered into the input device for specifying the desired traveling route (location data) and the data from the road network database are thereby taken into account.

In addition, the navigation device comprises a signal receiving unit for receiving position signals, particularly GPS signals. By means of an evaluation of said position signals in a position determining unit, the navigation device is capable of determining the current position of a vehicle.

Moreover, the navigation device comprises a display device, e. g. an LCD (liquid crystal display) flat screen. On the display device, in particular maps and the conventional route guidance action can be displayed.

Known navigation systems are equipped with a function referred to as map representation for displaying the route guidance action. In said map representation, the current position of the vehicle, the surrounding road network, special destinations and the planned route calculated by the navigation device are displayed. In the event that the route results to be somewhat longer than in the regular case, the size of the map representation needs to be correspondingly scaled down, so that the entire route can be displayed on the display device. However, scaling down the size of the map representation is thereby afflicted with the drawback that many details, in particular road names of roads to be traveled along the route or points where certain driving maneuvers have to be executed, cannot be represented whatsoever or else only in an insufficiently scaled-up fashion. In order to remedy this deficiency, known navigation devices are equipped with the optional function of performing a zoom into the map representation. Any such scaled-up representation of the map is thereby, however, afflicted with the drawback that the entire route cannot be represented on the display device at the same time anymore. Due to this prejudicial aspect, the user is required to manipulate the map section respectively represented on the display device along the planned route. Manipulating the map section in this way, however, comes along with the disadvantage that the driver may accidentally stray away from the planned route, resulting in that the driver will lose his/her bearings.

SUMMARY

Proceeding from the above described prior art, it is consequently an objective of the present invention to propose a new method for operating a navigation device, providing the user with the simple option to easily gather detailed information about the driving maneuvers to be subsequently executed and about the oncoming road segments.

The gist of the present invention resides in the aspect that when the current vehicle position has been determined, a route preview is correspondingly calculated and displayed. In the route preview, the planned route is represented as a simulated film sequence, starting from the current vehicle position. Thus, by means of a function referred to as user interaction, the user is provided with the option to embark on a simulated travel along the remaining road segments of the planned route in a constantly up-to-date fashion, starting from the current vehicle position. The representation of the map section during said simulated travel is thereby based on the representation corresponding to the conventional route guidance action. In this respect, it is particularly advantageous if the inventive method can be initiated during a currently performed route guidance action. Said user interaction can particularly be initiated by means of a separate button disposed on the navigation device or by means of touch screen interaction, whereby it is likewise conceivable to initiate an acoustic activation via voice control.

In such a situation where the user is for instance prompted to bring the vehicle to a short halt at traffic lights and wants to gather information about the road segments to be subsequently traveled, along with the corresponding road names and the driving maneuvers to be subsequently executed, by means of the inventive method the user is provided with a simple option for attaining this objective. By observing the route preview, the user is capable of gathering the necessary information as a function of the current vehicle position in a very quick and highly accurate manner. Time-consuming operational steps for performing a zoom into the map and for manipulating the zoomed-in map section along the planned route are omitted. Instead, the user can be provided with the image of the remaining route in a scaled-up representation, whereby by representing the remaining route in a film sequence, the represented pieces of information are temporally dispersed and hence equalized. As a result, unlike in the case of a freeze image, not all of the road names have to be displayed on the display device at the same time, but the same can rather be incorporated into the film sequence in a temporally staggered fashion.

It is advantageous if the navigation system automatically initiates the calculation of the route preview according to the inventive method in a stationary phase, resulting in that by means of activating the route preview, no time lag or else only an insignificant time lag is caused due to the calculation times. It is also advantageous if the calculation of the route preview is continued when the start of the route preview is displayed.

When the route preview is displayed, it is of course conceivable that the corresponding acoustic maneuvering instructions are output at the same time. In the light of the aspect that the route preview constitutes merely a simulation, the acoustic maneuvering instructions rather contribute to confusion. According to a preferred method alternative, provision is consequently made for that, when the route preview is displayed, no acoustic maneuvering instructions or else only a reduced number of acoustic maneuvering instructions corresponding to the visually displayed maneuvering instructions are output.

In order make it easier for the user to find his/her bearings when executing the impending maneuvers, in particular to pinpoint the roads to be subsequently traveled by means of displaying the route preview, it is particularly advantageous to display road names of roads that have to be passed when traveling along the planned route in the route preview. The displaying of the road names may thereby be preferably performed in a visually highlighted manner, so that the roads to be traveled can be distinguished from those that are irrelevant.

In the very same way, driving maneuvers that have to be executed when traveling along the planned route can be displayed in the route preview as well. In this respect, the driving maneuvers to be executed can likewise be represented in a visually highlighted fashion.

In addition, in line with the standard implementation of the inventive method, provision is made for that the road segments to be traveled and driving maneuvers to be executed are represented in real-time. In other words, this means that in line with said standard implementation, the simulated route preview is performed for the same period of time as that required for actually traveling along the route, whereby certain vehicle velocities used for traveling along the various road segments are taken as a basis. However, representing the route preview in real-time is disadvantageous in some special applications. If for instance long-distance travels along the freeway are included in the planned route, it is inexpedient to represent said road segments in real-time during simulation. In order to allow for that in the simulation of the route preview the displayed pieces of information are temporally compressed, it is consequently advantageous in any such instances if the route preview is represented in an accelerated fashion relative to the real-time representation and/or with omissions. Long travel distances along the freeway can hence either be faded out entirely or can be represented in an accelerated time of travel. In contrast, in case of road segments involving a plurality of driving maneuvers to be consecutively executed in short succession, in the real-time representation it is frequently infeasible to gather all of the represented pieces of information in this correspondingly short period of time. For any such applications it is consequently advantageous if the route preview is represented in a decelerated fashion relative to the real-time representation. Any such decelerated representation thereby corresponds to a slow-motion representation, so that the user is provided with the option to gather the represented information in a temporally staggered fashion.

The fundamental concept of the inventive method resides in that the route preview is respectively initiated starting from the current vehicle position. Consequently, the end of the route preview remains undefined and can for instance be located at the destination of the planned route. In the event of extremely long routes, this fact may, however, mean that the route preview results to be correspondingly long and can only be displayed with an accordingly long representation time. Any such long representation times for displaying the route preview are inexpedient in many driving situations, in particular when waiting at traffic lights. In many instances, it is therefore appropriate to restrict the length of the route preview. When taking such a measure, the route preview represents only one route section of the planned route. According to the present invention, the start of the route preview is always defined by the current vehicle position. The end of the route preview is defined by an intermediate point of the planned route. In this context, the marginal criteria for defining the intermediate point may vary.

According to a first alternative for defining the intermediate point, a predetermined maximum duration of the film sequence is specified. As a function of said maximum duration, a route preview that can be displayed within the maximum duration is subsequently calculated.

Representation times in the range of 10 to 20 seconds have proved to be particularly suitable for representing the route preview. Most traffic lights are set to trigger a signal change at time intervals of 10 to 30 seconds, during which the route preview can be indicated to the driver when the vehicle is stationary.

In order to adapt the duration of the route preview to the respectively prevailing application situation, it is particularly advantageous if the maximum duration of the route preview can be set by the user. In this way, the user is provided with the option to adapt the duration of the representation of the route preview to his/her personal needs.

Alternatively or additionally to defining the intermediate point of the planned route, which marks the end of the route preview, the number of the driving maneuvers included in the route preview can be preset as well. This method alternative makes it possible to confine the pieces of information represented in the route preview to such an extent that can reasonably be expected to be gathered by the user at a time. In such a situation where the driver is for instance provided with the route preview when waiting at traffic lights, it is inexpedient to indicate to the driver in this short period of time the next 20 driving maneuvers to be executed, for the driver will be incapable of memorizing this correspondingly large amount of information. Instead, only two to four, optionally a maximum of five, consecutive driving maneuvers should be indicated to the driver at a time.

According to a further method alternative that can be employed likewise additionally to the other method alternatives, the intermediate point of the route preview is defined by the distance of the planned route between the current vehicle position and the intermediate point. In this way, it is for instance possible to indicate to the driver the respectively next four, five or six kilometers of the planned route in the route preview.

When taking a decision on the length of the route, it is also appropriate to make a distinction subject to the type of the planned route. It is particularly expedient to make a distinction between in-town and out-of-town routes, so that in case of in-town routes, a preferably shorter distance is calculated than in case of out-of-town routes.

As an alternative thereto, the intermediate point can also be defined by the duration of the planned time of travel between the current vehicle position and the intermediate point. As a consequence, the duration of the route preview is confined in such a manner that it precisely corresponds to the duration between the current vehicle position and the intermediate point, whereby the corresponding vehicle velocities are assigned to the individual road segments and form the basis for the calculation of the intermediate point.

It is also possible to combine two or more of the previously specified parameters for defining the intermediate point, which marks the end of the route preview. In this respect, it is conceivable that either all of the parameters taken into account have reached the respective threshold value or else that the defined threshold value has been reached in the case of at least one parameter.

In order to provide the user with a maximum amount of information, the route preview allows the displaying of additional route data, for instance road names and/or distances to the road segments represented in the route preview and/or driving maneuvers and/or time of travel and/or time of arrival and/or the distance traveled since the starting point and/or since the last maneuvering action.

According to a preferred method alternative, by means of a traffic obstruction information receiver, for instance a Traffic Message Channel (TMC) receiver, up-to-date traffic obstruction information is received. Insofar as road segments are affected in accordance with the up-to-date traffic obstruction information, said road segments are represented in the route preview, in particular in a color-highlighted fashion or marked with a symbol indicative of a traffic obstruction. In this way, by observing the route preview, the user is provided with a simple overview of where the traffic obstruction zones are located on the planned route, whereby the user is enabled to correspondingly take intervening actions, for instance by initiating the calculation of alternative routes.

In order to inform the driver in the course of the route preview also about alternative routes by means of which he/she can likewise reach the desired destination, it is particularly advantageous to represent said alternative routes in the route preview. The representation can thereby be displayed in a specially color-highlighted fashion, in order to distinguish the alternative routes from the planned main route. By means of this method alternative, the user is provided with the option to rapidly gather information about alternative routes that can be traveled in case of imminent traffic congestions. If the user is for instance informed on the radio about traffic congestions affecting the main route being currently traveled, the driver is capable of rapidly pinpointing alternative routes by observing the route preview. On the basis thereof, the user is capable of subsequently defining certain road segments as being closed and can initiate the calculation of an alternative route constituting the new main route. This method alternative is also expedient in case of known lane closures, e. g. building sites etc.

By means of the inventive method, a simulated film sequence is calculated that can be displayed as route preview. The route preview consequently represents a type of film, so that it is possible to stop, fast-forward or rewind the film or to change between specific characteristic points of the film. For this reason, it is particularly advantageous if by means of activating an input element, the stopping, fast-forwarding, rewinding, changing over to the subsequent driving maneuver or the changing back to the previous driving maneuver can be initiated in the film sequence of the route preview. In this way, the user is conferred full control over the route preview display and is capable of conveniently manipulating the same.

By means of evaluating the position signals or by connecting a vehicle bus, in most navigation devices it is possible to detect the traveling state of the vehicle, in particular the acceleration and velocity thereof, respectively. In many instances, the displaying of the route preview will only be expedient when the vehicle is stationary, for instance when the driver is waiting at traffic lights. For this reason, it is preferable to monitor the traveling state of the vehicle when the route preview is displayed. In this respect, the route preview can be set to be dependent on whether the vehicle is stationary or traveling again. When the vehicle is stationary, the route preview is displayed, whereas the route preview is interrupted when the vehicle has started to move. The interruption of the route preview can thereby be initiated preferably automatically.

In the event that the route preview is interrupted when the vehicle has started to move, it is particularly preferable if the route guidance action of an ongoing route guidance operation of the navigation device is displayed on the display device again. When the vehicle is traveling, the user is provided with the full assistance of the navigation system to perform the travel along the planned route.

When the vehicle is stationary again, the interrupted route preview can subsequently be resumed, whereby the resumption of the route preview can be initiated in particular automatically.

In the event that an interrupted route preview is resumed, for instance due to the fact that the vehicle is stationary again, it should in each instance be verified whether the road segments and driving maneuvers represented in the route preview are still up-to-date or have already been traveled and executed, respectively. Any such road segments that are no longer up-to-date and driving maneuvers that have already been executed should not be displayed in the route preview anymore, in order to correspondingly shorten the route preview and to confine the same to any such pieces of information that are still up-to-date.

Besides, prior to resumption of an interrupted route preview it should be verified whether the vehicle is still traveling along the planned route displayed in the route preview. If the vehicle has already exited from the planned route, displaying the interrupted route preview is not expedient anymore, since assistance is not rendered by the same anymore. In such an instance, the interrupted route preview should be discarded and a completely new route preview should be generated and displayed when the route preview display is activated.

In certain driving situations, for instance during long-distance travels along the freeway, it is also conceivable that the route preview is displayed when the vehicle is traveling. When the route preview is represented on the display device when the vehicle is traveling, the route preview should, however, be interrupted automatically when for the ongoing route guidance operation a maneuvering instruction is due to be output, in particular displayed. In this way, it is possible to prevent that the displaying of up-to-date maneuvering instructions is suppressed or rendered infeasible by means of the route preview.

In the event that the route preview was interrupted as a result of the output of a maneuvering instruction, the same should be automatically resumed when the maneuvering instruction has been terminated.

Insofar as the maneuvering instruction is merely comprised of an acoustic instruction, the route preview should not be interrupted, for the same is in any case preferably displayed only visually on the display device and does not require any acoustic signals. Besides, during the route preview the maneuvering instructions can also be confined to acoustic signals irrespective of their type.

When the route preview is interrupted, various options for dealing with the displayed image content are provided. According to a first alternative, the image content of the display device can be frozen when the route preview is interrupted and can be displayed as a freeze image. Alternatively thereto, it is also conceivable that any such content that does not form part of the preview, such as maneuvering instructions, is displayed as an overlay. According to a further alternative, a changeover to regular representation of the ongoing route guidance operation is performed when the route preview has been interrupted.

In the event that a changeover has been performed, e. g. for representing the ongoing route guidance operation when the current route preview has been interrupted, the user can be informed about the interruption of the route preview by means of a corresponding display element, for instance an icon which is likewise displayed on the display device. Thus, the user is provided with the option to cancel the interruption of the route preview by entering appropriate operating commands and to consequently cause the route preview to be resumed.

In the event that the interrupted route preview has been discarded, for instance due to the fact that the vehicle of the driver has exited from the planned route, the frozen image content and the display element assigned to the interruption of the route preview respectively can be automatically deactivated, for the route preview cannot be displayed anymore anyway.

An embodiment of the present invention will be exemplarily illustrated in the drawing and will be briefly described in the following paragraph, wherein:

BRIEF DESCRIPTION OF THE DRAWINGS

FIG. 1 illustrates a navigation device with a screen, on which a route preview is displayed.

DETAILED DESCRIPTION

FIG. 1 illustrates a navigation device 1, wherein on the display device thereof, namely an LCD screen, a route preview film is displayed. The respective virtual position of the vehicle is displayed in the calculated route simulation by means of a symbol 2. In the left hand corner of the display device a maneuvering view 3 with an approximation bar 4 is displayed for clearly indicating to the driver in the route preview the respectively impending maneuver. In another field 6, the relevant road or the relevant location where the subsequent maneuver has to be executed is indicated to the driver. Besides, the planned remaining time of travel 7, the planned time of arrival at the destination 8 and the length of the remaining distance until the next maneuver is due to be executed are displayed to the driver. In another display region 10, the distance of the vehicle, starting from the current vehicle position, to the subsequent driving maneuver represented in the route preview is displayed, in order to inform the driver about the respective distance remaining until said driving maneuver is due to be performed.

By means of using operating elements 5, which are defined as fields on a touch screen, the user is provided with the option of stopping, fast-forwarding and rewinding the route preview film and of changing over to the subsequent maneuver or of changing back to the previous maneuver, respectively.

The invention claimed is:

1. A navigation device comprising:
an input device into which operating commands and location data can be entered,
a road network database,
a route calculation unit for calculating and storing a planned route taking into account the location data and the road network database,
a signal receiving unit for receiving position signals, particularly GPS signals,
a position determining unit for determining the current position of a vehicle by taking into account the received position signals, and
a display device operable to display a route preview,
wherein the route calculation unit is operable to calculate the route preview which represents at least one section of the planned route as a film sequence, starting from the current vehicle position;
wherein, in the route preview, only one route section of the planned route is represented, whereby the start of the route preview is defined on the basis of the current vehicle position, and whereby the end of the route preview is defined on the basis of an intermediate point of the planned route, which lies ahead of the destination of the planned route.

2. The navigation device according to claim 1, wherein the location data comprises destination data.

3. The navigation device according to claim 1, wherein the position signals are GPS signals.

4. The navigation device according to claim 1, wherein the calculation of the route preview is triggered during an ongoing route guidance operation of the navigation device by activation of an input element, and the calculated film sequence is displayed or cross-faded within the image representing the ongoing route guidance action.

5. The navigation device according to claim 1, wherein, when the route preview is displayed, no acoustic maneuvering instructions are output.

6. The navigation device according to claim 1, wherein, in the route preview, road names of roads that have to be passed when traveling along the planned route are displayed in a visually highlighted fashion.

7. The navigation device according to claim 1, wherein, in the route preview, driving maneuvers that have to be executed when traveling along the planned route are displayed in a visually highlighted fashion.

8. The navigation device according to claim 1, wherein, in the route preview, the road segments to be traveled and the driving maneuvers to be executed are represented in real-time.

9. The navigation device according to claim 1, wherein, in the route preview, at least some of the road segments to be traveled and driving maneuvers to be executed are represented in an accelerated fashion relative to the real-time representation.

10. The navigation device according to claim 1, wherein the intermediate point of the route preview is defined by a predetermined maximum duration of the film sequence.

11. The navigation device according to claim 10, wherein the maximum duration of the film sequence is about 10 to 30 seconds.

12. The navigation device according to claim 10, wherein the maximum duration of the route preview can be set by the user.

13. The navigation device according to claim 1, wherein the intermediate point of the route preview is defined by a predetermined number of driving maneuvers included in the route preview.

14. The navigation device according to claim 1, wherein the intermediate point of the route preview is defined by the distance of the planned route between the current vehicle position and the intermediate point.

15. The navigation device according to claim 14, wherein the distance for defining an intermediate point is dependent on the type of the planned route, particularly on whether the route is a primarily in-town route or a primarily out-of-town route.

16. The navigation device according to claim 1, wherein the intermediate point of the route preview is defined by the duration of the planned time of travel between the current vehicle position and the intermediate point.

17. The navigation device according to claim 1, wherein the intermediate point of the route preview is defined by a combination of multiple parameters.

18. The navigation device according to claim 1, wherein the route preview further includes driving maneuvers, the time of travel, the time of arrival and the distance traveled since the starting point.

19. The navigation device according to claim 1, wherein, by means of a traffic obstruction information receiver, up-to-date traffic obstruction information is received, whereby the road segments affected according to the up-to-date traffic obstruction information are represented in the route preview, in particular in a color-highlighted fashion.

20. The navigation device according to claim 1, wherein alternative routes that can be traveled alternatively to the planned route are represented in the route preview in a highlighted fashion.

21. The navigation device according to claim 1, wherein, in the route preview, a road segment can be defined as being closed by activation of an input element, and on the basis thereof an alternative route devoid of closed road segments is calculated.

22. The navigation device according to claim 1, wherein the film sequence of the route preview can be stopped, fast-forwarded, rewound, changed over to the subsequent driving maneuver and changed back to the previous driving maneuver by activation of an input element.

23. The navigation device according to claim 1, wherein the route preview is displayed when the vehicle is traveling, whereby the route preview is automatically interrupted when a maneuvering instruction for an ongoing route guidance operation is due to be output.

24. The navigation device according to claim 23, wherein the interrupted route preview is automatically resumed when the output of the maneuvering instruction has been terminated.

25. The navigation device according to claim 23, wherein the route preview is not interrupted when a maneuvering instruction for an ongoing route guidance operation is output only acoustically.

26. A navigation device comprising:
    an input device into which operating commands and location data can be entered,
    a road network database,
    a route calculation unit for calculating and storing a planned route taking into account the location data and the road network database,
    a signal receiving unit for receiving position signals, particularly GPS signals,
    a position determining unit for determining the current position of a vehicle by taking into account the received position signals, and
    a display device operable to display a route preview,
    wherein the route calculation unit is operable to calculate the route preview which represents at least one section of the planned route as a film sequence, starting from the current vehicle position;
    wherein the traveling state of the vehicle is monitored when the route preview is displayed, whereby the route preview is displayed when the vehicle is stationary, and whereby the route preview is interrupted when the vehicle has started to move.

27. The navigation device according to claim 26, wherein, when the route preview is interrupted, the route guidance action of an ongoing route guidance operation of the navigation device is displayed.

28. The navigation device according to claim 26, wherein an interrupted route preview is resumed when the vehicle is stationary again.

29. The navigation device according to claim 26, wherein, prior to resumption of the interrupted route preview, the route calculation unit is further operable to verify whether the route segments and driving maneuvers represented in the route preview have already been traveled and executed, respectively whereby the road segments and driving maneuvers already traveled and executed, respectively, are not displayed in the route preview anymore.

30. The navigation device according to claim 26, wherein, prior to resumption of the interrupted route preview, the route calculation unit is further operable to verify whether the vehicle is still traveling along the planned route displayed in the route preview, whereby when the vehicles has exited from the planned route, the interrupted route preview is discarded.

31. The navigation device according to claim 26, wherein, when the route preview is interrupted, a changeover to the standard representation of the ongoing route guidance operation is performed.

32. The navigation device according to claim 23, wherein a display element assigned to the interruption of the route preview is automatically deactivated when the route preview is discarded.

33. The navigation device according to claim 26, wherein, when the route preview is interrupted, a display element assigned to the interruption is displayed.

* * * * *